US006915993B2

(12) United States Patent
O'Leary

(10) Patent No.: US 6,915,993 B2
(45) Date of Patent: Jul. 12, 2005

(54) GLIDE ATTACHMENT FOR FURNITURE LEG

(75) Inventor: Clement Ashton O'Leary, 1116 - 10770 Winterburn Road, Edmonton, Alberta (CA), T5S 1T6

(73) Assignees: Clement Ashton O'Leary, Edmonton (CA); Joy Alice O'Leary, Edmonton (CA)

( * ) Notice: Subject to any disclaimer, the term of this patent is extended or adjusted under 35 U.S.C. 154(b) by 0 days.

(21) Appl. No.: 10/434,522

(22) Filed: May 8, 2003

(65) Prior Publication Data

US 2003/0234331 A1 Dec. 25, 2003

Related U.S. Application Data

(60) Division of application No. 09/228,216, filed on Jan. 11, 1999, now Pat. No. 6,563,553, which is a continuation-in-part of application No. 08/784,440, filed on Jan. 16, 1997, now Pat. No. 6,680,758.

(30) Foreign Application Priority Data

Jun. 20, 2002 (CA) ............................................. 2390951

(51) Int. Cl.[7] .............................................. A47B 91/00
(52) U.S. Cl. .................................. 248/188.9; 248/188.8
(58) Field of Search ......................... 248/346.11, 188.8, 248/188.9, 188.91; 16/42 R, 42 T

(56) References Cited

U.S. PATENT DOCUMENTS

| | | | | |
|---|---|---|---|---|
| 780,684 A | * | 1/1905 | Pratt ........................ | 248/188.9 |
| 2,860,368 A | * | 11/1958 | Thornsbury ................. | 16/42 R |
| 4,923,158 A | * | 5/1990 | Saisho ...................... | 248/188.8 |
| 5,010,621 A | * | 4/1991 | Bock .............................. | 16/39 |
| 5,088,669 A | * | 2/1992 | Zinnbauer ................ | 248/188.9 |
| 5,142,734 A | * | 9/1992 | Looman et al. ................. | 16/19 |
| 5,169,115 A | * | 12/1992 | Chung Hsiang ............ | 248/677 |
| 5,170,972 A | * | 12/1992 | Casals Guell ............ | 248/188.9 |
| 5,287,595 A | * | 2/1994 | Stevens, Jr. ................. | 16/42 T |
| 6,027,086 A | * | 2/2000 | Heitlinger et al. ....... | 248/188.5 |
| 6,478,270 B2 | * | 11/2002 | Parisi et al. ............. | 248/188.8 |

* cited by examiner

Primary Examiner—Leslie A. Braun
Assistant Examiner—A. Joseph Wujciak
(74) Attorney, Agent, or Firm—Davis & Bujold, P.L.L.C.

(57) ABSTRACT

A furniture glide includes a cylindrical elastomeric body adapted for insertion into a tubular furniture leg. The body has a first end and a second end. An integrally formed bulbous support is positioned at the first end of the body. At least two integrally formed discrete engagement members are positioned at the second end of the body with a centrally positioned gap between the at least two engagement members. Upon insertion of a pressure member into the gap when the second end of the body is positioned within the tubular furniture leg, the at least two engagement members are forced outwardly and into engagement with the tubular furniture leg.

3 Claims, 4 Drawing Sheets

GLIDE ATTACHMENT FOR FURNITURE LEG

RELATED APPLICATION

The present invention is a divisional application of U.S. patent application Ser. No. 09/228,216 filed on Jan. 11, 1999, entitled "Flat Panel Display and Method of Manufacture", now U.S. Pat. No. 6,563,553 granted on May 13, 2003, which is a Continuation-in-part of application Ser. No. 08/784,440 filed Jan. 16, 1997, entitled "Flat Panel Display and a Method of Fabrication", now U.S. Pat. No. 6,680,758 granted on Jan. 20, 2004, both of which are incorporated by reference herein.

FIELD OF THE INVENTION

The present invention relates to a glide attachment for a furniture leg and, in particular, tubular furniture legs.

BACKGROUND OF THE INVENTION

In order to prevent chair and table legs from damaging floors, each chair and table leg is equipped with a glide attachment. There are a wide variety of furniture glides that have been developed for use with tubular furniture legs, such as U.S. Pat. Nos. 1,604,293; 2,513,193; 5,287,595; 6,088,877.

SUMMARY OF THE INVENTION

The present invention relates to an alternative furniture glide developed for use with tubular furniture legs.

According to the present invention there is provided a furniture glide which includes a cylindrical elastomeric body adapted for insertion into a tubular furniture leg. The body has a first end and a second end. An integrally formed bulbous support is positioned at the first end of the body. At least two integrally formed discrete engagement members are positioned at the second end of the body with a centrally positioned gap between the at least two engagement members. Upon insertion of a pressure member into the gap when the second end of the body is positioned within the tubular furniture leg, the at least two engagement members are forced outwardly and into engagement with the tubular furniture leg.

The furniture glide, as described above, is readily inserted into a tubular furniture leg and then secured in position by inserting a pressure member which causes the engagement members to deform outwardly to engage the tubular furniture leg.

Although beneficial results may be obtained through the use of the furniture glide, as described above, the correct placement of the pressure member is a concern. One wants to ensure that the pressure member has been extended into the gap. One also wants to ensure that the pressure member is not going to protrude downwardly within the bulbous support. If the pressure member were within the bulbous support, as the bulbous support began to wear the pressure member would become exposed and cause damage the floor. Even more beneficial results may, therefore, be obtained when a centrally positioned axial guide channel is provided in the first end of the body. The guide channel guides movement of the pressure member to ensure that is properly positioned in the gap between the engagement members and enables a remote end of the pressure member to be recessed in spaced relation to the bulbous support.

Although beneficial results may be obtained through the use of the furniture glide, as described above, should the pressure member become dislodged, the engagement members would release their grip on the tubular furniture leg. This could result in the furniture glide falling out as the furniture was lifted or moved. Even more beneficial results may, therefore, be obtained when the guide channel is a blind bore and the pressure member is a pin which is adapted to penetrate the body at a remote end of the blind bore to access the gap between the engagement members. This enables the body to provide a friction engagement which prevents inadvertent removal of the pin.

Although beneficial results may be obtained through the use of the furniture glide, as described above, all tubular furniture legs are constructed with internal diameters within specific tolerances. It is important that the furniture glide be able to fit all of the tubular furniture legs within those tolerances. Even more beneficial results may, therefore, be obtained when the body has outwardly extending vanes. This enables the body to better engage tubular furniture legs with varying internal diameters.

BRIEF DESCRIPTION OF THE DRAWINGS

These and other features of the invention will become more apparent from the following description in which reference is made to the appended drawings, the drawings are for the purpose of illustration only and are not intended to in any way limit the scope of the invention to the particular embodiment or embodiments shown, wherein.

DETAILED DESCRIPTION OF THE PREFERRED EMBODIMENT

Figure 1:
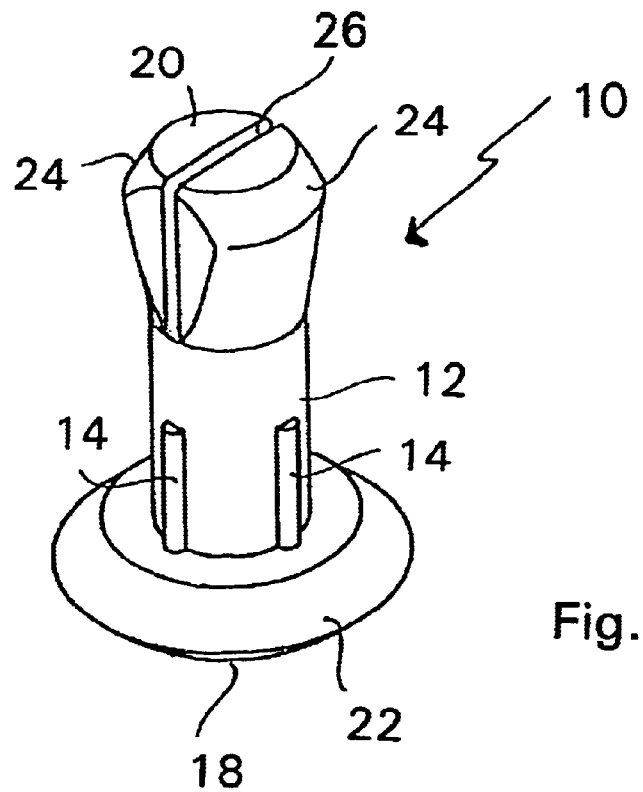
FIG. 1 is a top perspective view of a furniture glide constructed in accordance with the teachings of the present invention.

The preferred embodiment, a furniture glide generally identified by reference numeral 10, will now be described with reference to FIGS. 1 through 6.

Figure 2:
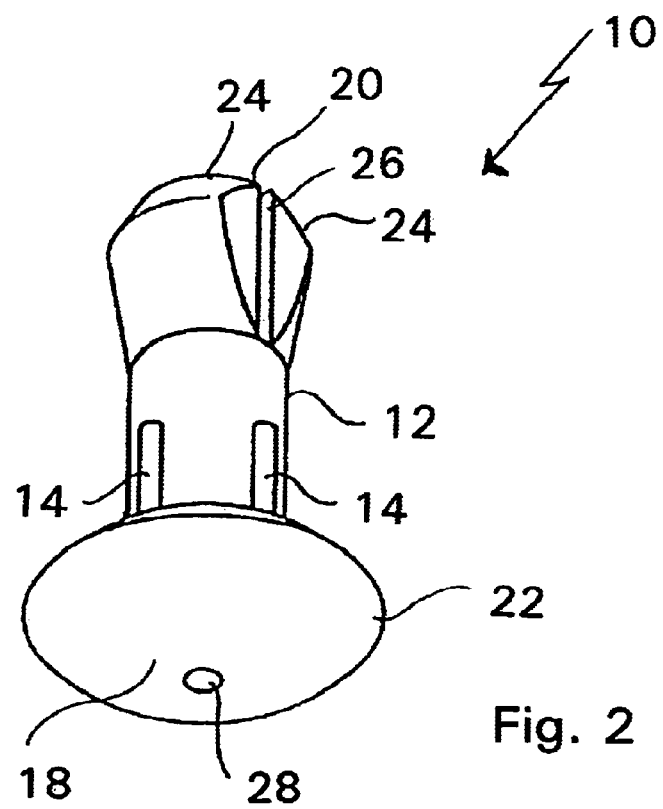
FIG. 2 is a bottom perspective view of a furniture glide constructed in accordance with the teachings of the present invention.
Figure 3:
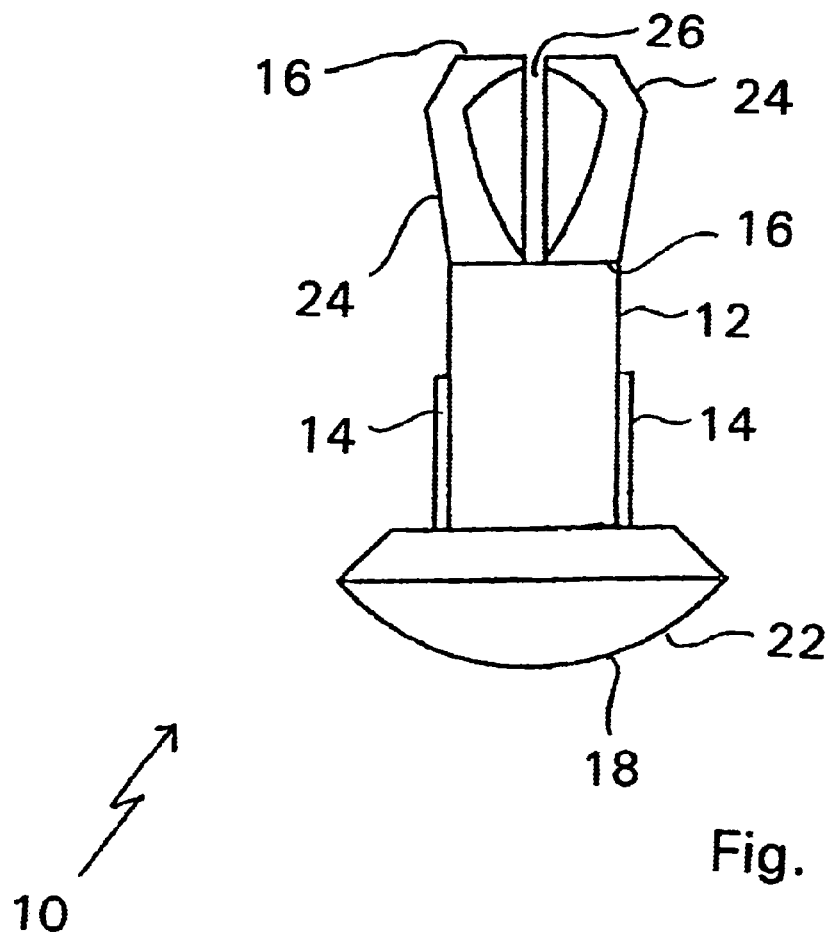
FIG. 3 is a side elevation view of the furniture glide illustrated in FIG. 1.
Figure 4:
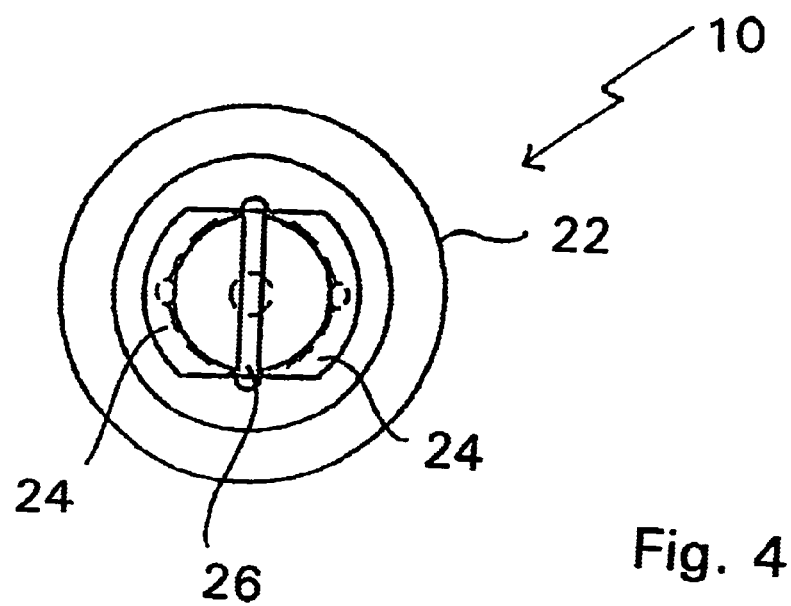
FIG. 4 is a top plan view of the furniture glide illustrated in FIG. 1.
Figure 6:
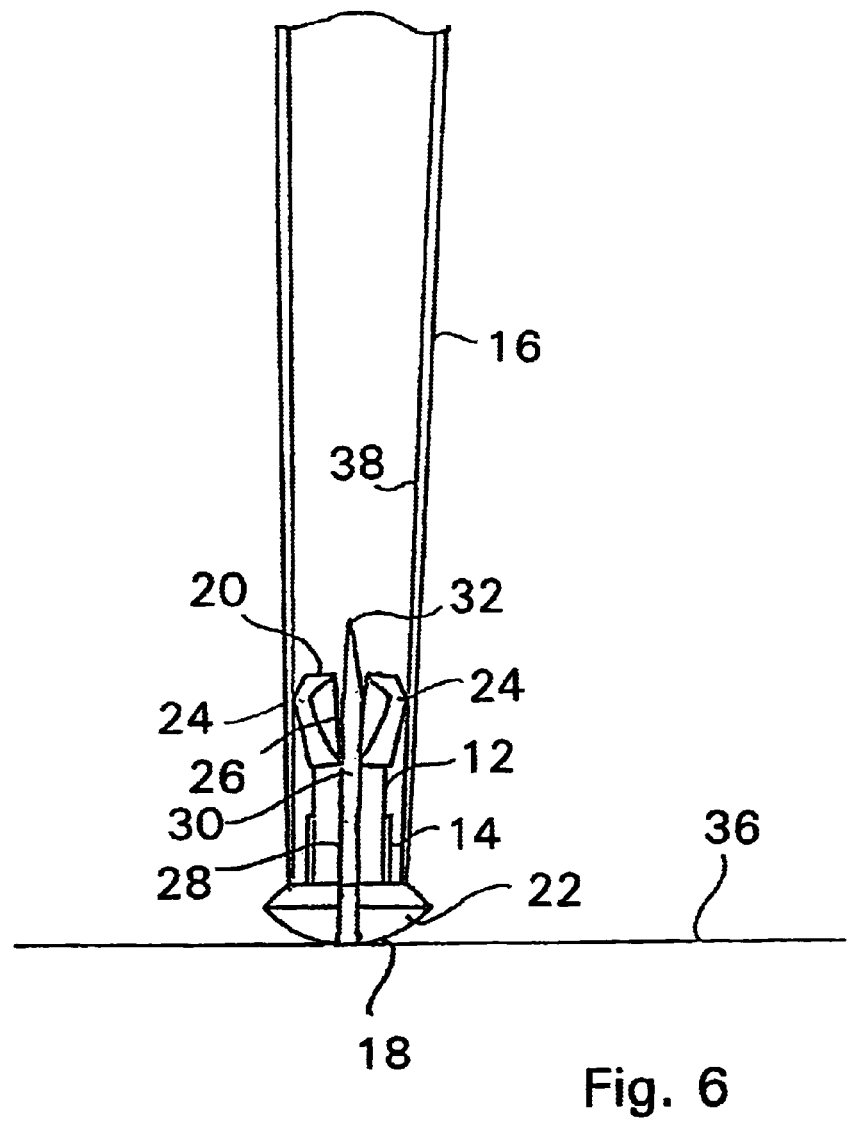
FIG. 6 is a side elevation view, in section, of the furniture glide illustrated in FIG. 1, inserted into a tubular furniture leg and secured in position with a pressure member.

Structure and Relationship of Parts:

Referring to FIGS. 1 and 2, there is provided a furniture glide 10, which includes a cylindrical elastomeric body 12 with outwardly extending vanes 14. Referring to FIG. 6, body 12 is adapted for insertion into a tubular furniture leg 16. Referring to FIG. 3, body 12 has a first end 18 and a second end 20. An integrally formed bulbous support 22 is positioned at first end 18 of body 12. Two integrally formed discrete engagement members 24 are positioned at second end 20 of body 12 with a centrally positioned gap 26 illustrated in FIG. 4, between engagement members 24.

Figure 5:
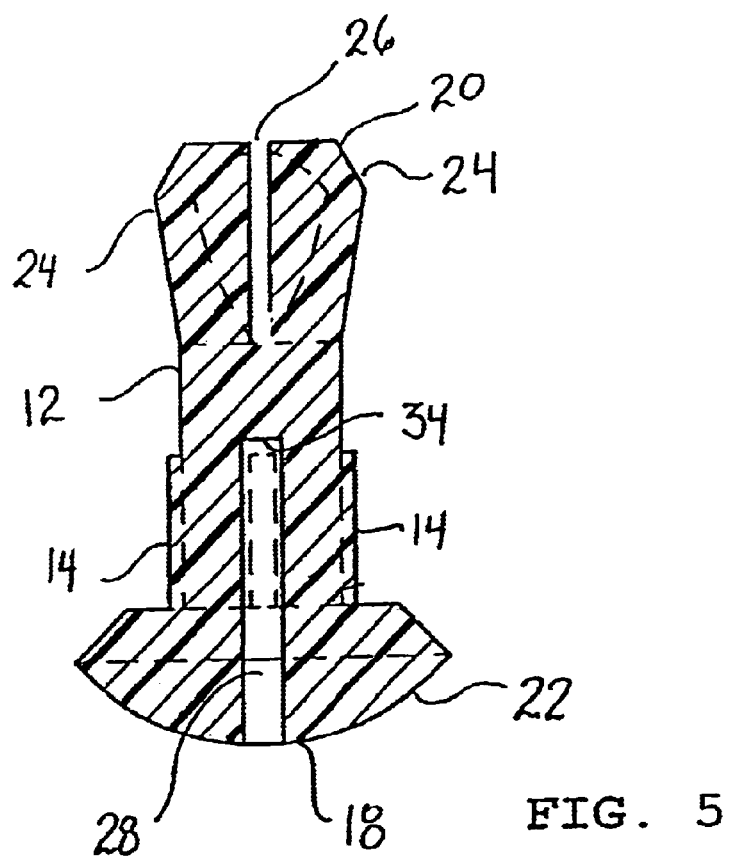
FIG. 5 is a side elevation view, in section, of the furniture glide illustrated in FIG. 1.

Referring to FIG. 5, a blind bore 28 is provided in first end 18 of body 12. Blind bore 28 serves to guide movement of a pin 30 illustrated in FIG. 6, which is to be inserted into blind bore 28, and enables a remote end 32 of pin 30 to be recessed in spaced relation to bulbous support 22. Referring to FIG. 6, pin 30 is adapted to penetrate body 12 at a remote end 34 of blind bore 28 illustrated in FIG. 5, to access gap 26 between engagement members 24, such that engagement members 24 will be forced outwardly and into engagement with tubular furniture leg 16.

Referring to FIG. 6, body 12 provides a friction engagement to prevent inadvertent removal of pin 30. It will be appreciated that instead of blind bore 28, other forms of centrally positioned axial guide channels could also be used. In the illustrated embodiment, pin 30 is illustrated as being inserted into blind bore 28, however other types of pressure members can be used, so long as they are adapted to be inserted into gap 26 such that engagement members 24 will be forced outwardly and into engagement with tubular furniture leg 16.

Operation:

The use and operation of furniture glide generally identified by reference numeral 10, will now be described with reference to FIGS. 1 through 6. Referring to FIG. 6, body 12 is positioned within tubular furniture leg 16. Vanes 14 on body 12 permit body 12 to better engage tubular furniture leg 16. Vanes 14 can also be used to facilitate engagement with tubular furniture legs 16 of varying internal diameters.

After positioning body 12 within tubular furniture leg 16, remote end 32 of pin 30 is inserted into blind bore 28. Blind bore 28 guides pin 30 as pin 30 penetrates body 12 at remote end 34 of blind bore 28 to access gap 26 between engagement members 24. Blind bore 28 also enables remote end 32 of pin 30 to be recessed in spaced relation to bulbous support 22. Blind bore 28 serves to facilitate correct placement of pin 30 to ensure that pin 30 has been extended into gap 26 and to ensure that pin 30 is not going to protrude downwardly within bulbous support 22. If pin 30 was incorrectly placed whereby pin 30 was within bulbous support 22, pin 30 would eventually become exposed as bulbous support 22 begins to wear during use, and cause damage a floor 36.

As pin 30 is inserted into gap 26, engagement members 24 are forced outwardly and into engagement with interior sidewall 38 of tubular furniture leg 16. As pin 30 penetrates body 12 at remote end 34 of blind bore 28 to access gap 26 between engagement members 24, body 12 is able to provide a friction engagement which prevents inadvertent removal of pin 30 which could otherwise result in furniture glide 10 falling out as the furniture leg 16 was lifted or moved.

In the illustrated embodiment, second end of body is shown as having two integrally formed discrete engagement members 24, however it will be appreciated that there could be more than two engagement members 24.

Cautionary Warnings:

Glides should be made from an elastomer that is sufficiently hard and slippery as to slide along the floor. If the elastomer is soft, it will wear rapidly and will tend to pick up grit.

In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be one and only one of the elements.

It will be apparent to one skilled in the art that modifications may be made to the illustrated embodiment without departing from the spirit and scope of the invention as hereinafter defined in the Claims.

The embodiments of the invention in which an exclusive property or privilege is claimed are defined as follows:

1. A furniture glide, comprising:

a cylindrical elastomeric body adapted for insertion into a tubular furniture leg, the body having a first end and a second end;

an integrally formed bulbous support positioned at the first end of the body;

at least two integrally formed discrete engagement members positioned at the second end of the body with a centrally positioned gap providing complete separation between the at least two engagement members such that upon insertion of a pressure member into the gap that has a width larger than the gap when the second end of the body is positioned within the tubular furniture leg, the at least two engagement members are forced outwardly and into engagement with the tubular furniture leg;

a centrally positioned axial guide channel being provided in the first end of the body, such that the guide channel guides movement of the pressure member and enables a remote end of the pressure member to be recessed in spaced relation to the bulbous support, the guide channel being a blind bore and the pressure member being a pin which is adapted to penetrate the body at a remote end of the blind bore and extend through a solid portion of the body to access the gap between the engagement members, the solid portion of the body providing a friction engagement to prevent inadvertent removal of the pin.

2. The furniture glide as defined in claim 1, wherein the body has outwardly extending vanes, thereby enabling the body to better engage tubular furniture legs with varying internal diameters.

3. A furniture glide, comprising:

a cylindrical elastomeric body having outwardly extending vanes adapted for insertion into a tubular furniture leg, the body having a first end and a second end;

an integrally formed bulbous support positioned at the first end of the body;

at least two integrally formed discrete engagement members positioned at the second end of the body with a centrally positioned gap providing complete separation between the at least two engagement members such that upon insertion of a pressure member into the gap that has a width larger than the gap when the second end of the body is positioned within the tubular furniture leg, the at least two engagement members are forced outwardly and into engagement with the tubular furniture leg;

a centrally positioned axial guide channel being provided in the first end of the body, such that the guide channel guides movement of the pressure member and enables a remote end of the pressure member to be recessed in spaced relation to the bulbous support, the guide channel being a blind bore and the pressure member being a pin which is adapted to penetrate the body at a remote end of the blind bore and extend through a solid portion of the body to access the gap between the engagement members, the solid portion of the body providing a friction engagement to prevent inadvertent removal of the pin.

* * * * *